(12) United States Patent
Belakshe et al.

(10) Patent No.: US 10,221,658 B2
(45) Date of Patent: Mar. 5, 2019

(54) TREATMENT FLUIDS COMPRISING CARMINIC ACID AND RELATED COMPOUNDS AND METHOD FOR USE THEREOF

(71) Applicant: Halliburton Energy Services, Inc., Houston, TX (US)

(72) Inventors: Ravikant S. Belakshe, Pune (IN); Sumit Ramesh Songire, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/744,755

(22) PCT Filed: Aug. 14, 2015

(86) PCT No.: PCT/US2015/045228
§ 371 (c)(1),
(2) Date: Jan. 12, 2018

(87) PCT Pub. No.: WO2017/030527
PCT Pub. Date: Feb. 23, 2017

(65) Prior Publication Data
US 2018/0208828 A1      Jul. 26, 2018

(51) Int. Cl.
*E21B 37/06*    (2006.01)
*E21B 43/26*    (2006.01)
(Continued)

(52) U.S. Cl.
CPC .............. *E21B 37/06* (2013.01); *C09K 8/52* (2013.01); *C09K 8/528* (2013.01); *C09K 8/54* (2013.01);
(Continued)

(58) Field of Classification Search
None
See application file for complete search history.

(56) References Cited

U.S. PATENT DOCUMENTS 3,252,980 A    5/1966    Bolmer et al.
4,734,259 A    3/1988    Frenier et al.
(Continued)

FOREIGN PATENT DOCUMENTS

WO    WO-2010065142 A1    6/2010
WO    WO-2014028375 A1    2/2014
WO    WO-2015088675 A1    6/2015

OTHER PUBLICATIONS

Nasr-El-Din et al., "Investigation of a Single-Stage Sandstone Acidizing Fluid for High-Temperature," SPE 107636, 2007, 12 pages.
(Continued)

*Primary Examiner* — Anuradha Ahuja
(74) *Attorney, Agent, or Firm* — Thomas Rooney; C. Tumey Law Group PLLC

(57) ABSTRACT

Chelating agents and silica scale control additives are often employed separately in conjunction with performing a dissolution process in a subterranean formation containing a siliceous material. Carminic acid and related compounds may be used to perform similar functions dually in various subterranean treatment operations. Methods for treating a subterranean formation can comprise: providing a treatment fluid comprising a carrier fluid and an ortho-dihydroxylated aromatic compound comprising a substance selected from the group consisting of carminic acid, kermesic acid, any salt thereof, any derivative thereof, and any combination thereof; and introducing the treatment fluid into a subterranean formation.

12 Claims, 1 Drawing Sheet

(51) Int. Cl.
*C09K 8/52* (2006.01)
*C09K 8/72* (2006.01)
*C09K 8/528* (2006.01)
*C09K 8/54* (2006.01)
*C09K 8/74* (2006.01)
*E21B 41/02* (2006.01)

(52) U.S. Cl.
CPC ............. *C09K 8/72* (2013.01); *C09K 8/74* (2013.01); *E21B 41/02* (2013.01); *E21B 43/26* (2013.01); *C09K 2208/32* (2013.01)

(56) References Cited

U.S. PATENT DOCUMENTS

| | | | |
|---|---|---|---|
| 5,085,842 A | 2/1992 | Porz et al. | |
| 5,336,441 A | 8/1994 | Shah et al. | |
| 5,380,706 A | 1/1995 | Himes et al. | |
| 5,462,721 A | 10/1995 | Pounds et al. | |
| 5,665,242 A | 9/1997 | Gallup | |
| 6,117,364 A | 9/2000 | Vorderbruggen et al. | |
| 6,350,721 B1* | 2/2002 | Fu | C09K 8/72 507/203 |
| 6,376,455 B1* | 4/2002 | Friedli | A61K 8/416 510/515 |
| 8,316,941 B2 | 11/2012 | Frenier et al. | |
| 8,580,715 B2 | 11/2013 | Peng et al. | |
| 2002/0147114 A1* | 10/2002 | Dobson, Sr. | C09K 3/00 507/242 |
| 2005/0169794 A1 | 8/2005 | Welton et al. | |
| 2006/0243449 A1* | 11/2006 | Welton | C09K 8/528 166/307 |
| 2007/0258913 A1* | 11/2007 | Rossel | A61K 31/122 424/49 |
| 2008/0081030 A1* | 4/2008 | DeMark | A01M 1/2011 424/84 |
| 2009/0233819 A1 | 9/2009 | Fuller et al. | |
| 2012/0006552 A1* | 1/2012 | Alsop | B09C 1/10 166/310 |
| 2012/0145401 A1 | 6/2012 | Reyes | |
| 2012/0172263 A1 | 7/2012 | Reyes et al. | |
| 2014/0190870 A1 | 7/2014 | Lehrer et al. | |
| 2015/0114653 A1* | 4/2015 | Conway | C09K 8/52 166/308.2 |
| 2015/0315885 A1* | 11/2015 | Reyes | C09K 8/03 166/300 |
| 2015/0322329 A1* | 11/2015 | Reyes | C09K 8/74 166/304 |

OTHER PUBLICATIONS

Reyes et al., "Properties and Applications of an Alternative Aminopolycarboxylic Acid for Acidizing of Sandstones and Carbonates," SPE 165142, 2013, 18 pages.

Harris et al., "The structure of the colourant/pigment, carmine derived from carminic acid," Journal of Chemical Research, Jul. 2009, pp. 407-409.

International Search Report and Written Opinion from PCT/US2015/045228, dated May 13, 2016, 7 pages.

\* cited by examiner

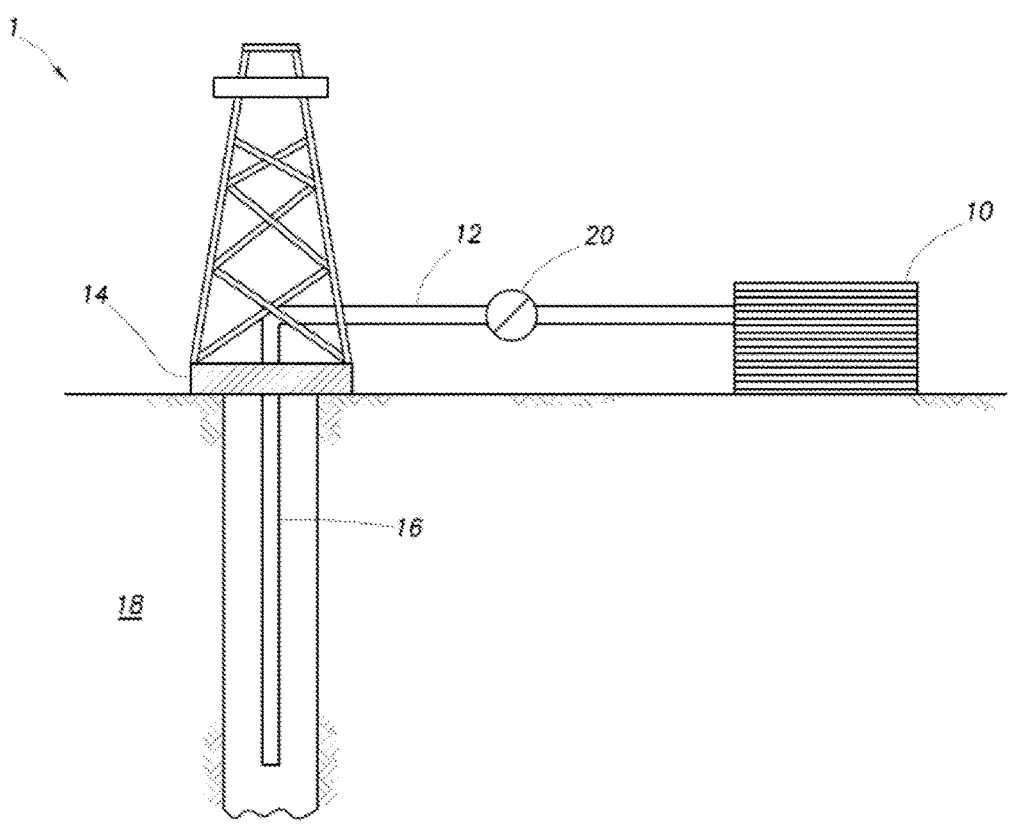

TREATMENT FLUIDS COMPRISING CARMINIC ACID AND RELATED COMPOUNDS AND METHOD FOR USE THEREOF

BACKGROUND

The present disclosure generally relates to subterranean treatment operations and, more specifically, to treatment fluids and methods for inhibiting precipitation and/or corrosion.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof will refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like.

Downhole acidizing operations and like dissolution processes (e.g., descaling and damage removal operations) may be used to stimulate a subterranean formation for increasing production of a hydrocarbon resource therefrom. During an acidizing operation or a like dissolution process, an acid-soluble material in the subterranean formation may be dissolved by one or more acids to expand existing flow pathways in the subterranean formation, to create new flow pathways in the subterranean formation, and/or to remove acid-soluble precipitation damage in the subterranean formation, thereby stimulating the formation's production capabilities. Introduction of an acidizing fluid to a subterranean formation may take place at matrix flow rates without fracturing of the formation matrix or at higher injection rates and pressures to fracture the formation, the latter being commonly referred to as an acid-fracturing operation. The acid-soluble material being dissolved by the acid(s) may be part of or formed from the native formation matrix or may have been deliberately introduced into the subterranean formation in conjunction with a treatment operation (e.g., bridging agents, proppants, or gravel particulates). Illustrative substances within the native formation matrix that may be dissolved by an acid include, but are not limited to, carbonates, silicates and aluminosilicates, which may be present alone or in combination with one another in formations of mixed mineralogy. Other substances may also be dissolved during the course of performing an acidizing operation or like dissolution process, and the foregoing substances should not be considered to limit the scope of substances that may undergo dissolution. The acids used during such dissolution processes may also be corrosive toward various types of metal surfaces (e.g., pipelines, tubulars and other downhole metal goods), and numerous corrosion inhibitors have been developed to lessen the severity of corrosion.

Carbonate formations can contain minerals that comprise a carbonate anion (e.g., calcite (calcium carbonate), dolomite (calcium magnesium carbonate), siderite (iron carbonate) and like minerals). When acidizing a carbonate formation, acidity of the treatment fluid alone may often be sufficient to solubilize a carbonate material by decomposing the carbonate anion to carbon dioxide and leeching a metal ion into the treatment fluid. Both mineral acids and organic acids may be used to treat a carbonate formation in this respect, often with similar degrees of success. Since it is relatively inexpensive, hydrochloric acid is very commonly used, typically in concentrations up to about 28% by volume. Other mineral acids and organic acids may be commonly used as well.

Siliceous formations can contain minerals such as, for example, zeolites, clays, feldspars and sandstone. As used herein, the term "siliceous" will refer to a substance having the characteristics of silica, including silicates and/or aluminosilicates. The acids that can effectively dissolve carbonate materials may have little effect on siliceous materials. Hydrofluoric acid, however, can react very readily with siliceous materials to promote their dissolution. Oftentimes, a secondary mineral acid or an organic acid can be used in conjunction with hydrofluoric acid to maintain a low pH state as the hydrofluoric acid becomes spent during dissolution of a siliceous material, where the low pH state helps promote continued solubilization of the siliceous material. Many types of siliceous formations can also contain varying amounts of carbonate materials. Most sandstone formations, for example, contain about 40% to about 98% sand quartz particles (i.e., silica) that are bonded together by various amounts of cementing materials, which may be siliceous in nature (e.g., aluminosilicates or other silicates) or non-siliceous in nature (e.g., carbonates, such as calcite). When siliceous materials are co-present with carbonate materials, significant precipitation issues can frequently be encountered due to interaction of dissolved metal ions from the carbonate material with fluoride ions from the hydrofluoric acid. For example, calcium ions liberated from a carbonate material can react readily with fluoride ions to form highly insoluble calcium fluoride, which can lead to extensive damage within a subterranean formation. Other metal ions, such as aluminum, can also be problematic in this regard. During sandstone acidizing, for example, aluminum scale and calcium fluoride precipitation issues can be very problematic.

One approach that can be used to address the presence of metal ions in a subterranean formation is to employ chelating agents that effectively sequester any problematic metal ions in a metal-ligand complex once the metal ions have been liberated from their source. As used herein, the terms "complex," "complexing," "complexation" and other variants thereof will refer to the formation of a metal-ligand bond without reference to the mode of bonding. Although complexation of a metal ion may involve a chelation process in some embodiments, complexation is not deemed to be limited in this manner. Once bound in a metal-ligand complex, the problematic metal ions may be substantially unable to undergo a further reaction to form damaging metal-containing precipitates. Although precipitation can be a particular concern when acidizing a siliceous material, chelating agents may also be used with similar benefits in conjunction with acidizing subterranean formations that comprise substantially only a carbonate material. In addition to sequestering previously liberated metal ions, chelating agents may also be used to affect direct dissolution of a metal ion from a carbonate material, even without another acid being present.

Dissolved silicon compounds from siliceous formations can also be very problematic, both by themselves and in the presence of metal ions. Alkali metal ions, for example, in the presence of dissolved silicon compounds can lead to formation of highly insoluble alkali metal fluorosilicates. Metal ions such as aluminum can also lead to vigorous re-precipitation of previously dissolved silicon compounds. Although dissolved silicon compounds can initially be soluble at low pH values during an acidizing operation or like dissolution process, the solubility limit may be quickly exceeded as the acid spends and the pH rises, thereby leading to re-precipitation of various silicon species even in the absence of dissolved metal ions. The re-precipitated silicon species may be in a variety of forms such as, for example, amorphous silica, silica gels, colloidal silica and/or hardened silica scales. In some instances, re-precipitation of previously dissolved silicon compounds can be even more damaging to a subterranean formation than if an acidizing operation or like dissolution process had not been performed in the first place.

To combat the detrimental effects resulting from re-precipitation of dissolved silicon compounds, a number of silica scale control additives have been identified. As used herein, the term "silica scale control additive" will refer to a substance that limits deposition of amorphous, gelatinous and/or colloidal silica that leads to silica scale buildup. Illustrative silica scale control additives that have been used in this regard include, but are not limited to, polyaminoamide dendrimers, polyethyleneimine, carboxymethylinulin, polyacrylates, phosphonates, aminocarboxylic acids, polyaminocarboxylic acids and ortho-dihydroxybenzene compounds related to tannic acid.

BRIEF DESCRIPTION OF THE DRAWING

The following FIGURE is included to illustrate certain aspects of the present disclosure, and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a system that can deliver treatment fluids of the present disclosure to a downhole location.

DETAILED DESCRIPTION

The present disclosure generally relates to subterranean treatment operations and, more specifically, to treatment fluids and methods for inhibiting precipitation and/or corrosion.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As summarized above, acidizing operations and like dissolution processes conducted in a subterranean formation containing a siliceous material can be exceedingly complicated. In addition to affecting its initial dissolution with hydrofluoric acid, there can be multiple and competing re-precipitation pathways to consider when devising a dissolution process for a siliceous material. Such competing re-precipitation pathways may include, for example, re-precipitation of dissolved silicon compounds upon exceeding their solubility limit, formation of insoluble compounds upon interaction of dissolved metal ions with dissolved silicon compounds, and/or formation of insoluble compounds upon interaction of dissolved metal ions with fluoride ions. Depending on the actual conditions present in a given subterranean formation, a particular re-precipitation pathway may be predominant.

Although chelating agents may be used to suppress some types of metal-based re-precipitation, the use of chelating agents is not without challenges. One significant concern is that some chelating agents can be toxic and/or non-biodegradable, thereby adding to the environmental burden of a treatment operation. Some chelating agents also may not effectively complex metal ions under the particular conditions that are present in a given subterranean formation. In addition, some chelating agents can be expensive and add considerably to production costs.

Similarly, re-precipitation of dissolved silicon may be at least partially suppressed by using silica scale control additives. However, some silica scale control additives in common use may not be entirely effective for their intended purpose, particularly as pH values increase into the circum-neutral region (i.e., pH=6-8) upon spending of an acid. In this regard, tannic acid and related compounds can be particularly effective for suppressing re-precipitation at higher pH values.

Chelating agents and silica scale control additives usually have disparate chemical structures, and a class of generally non-toxic compounds that can dually perform these functions is not believed to have been heretofore identified. In this regard, the present inventors discovered that carminic acid or its aglycon (kermesic acid) possess a number of structural features that may be beneficial for addressing multiple re-precipitation issues when acidizing a subterranean formation comprising a siliceous material. The structures of carminic acid and kermesic acid are shown in Formula 1 below.

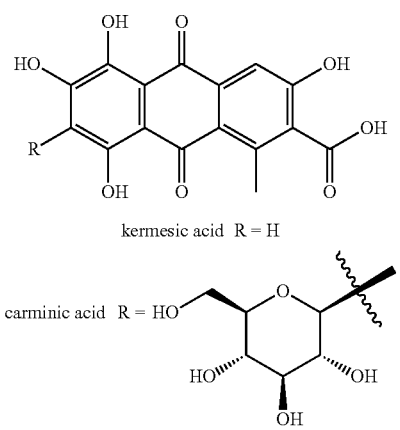

Formula 1

Related compounds, such as isokermesic acid (Formula 2) and the desmethyl analogues of carminic acid, kermesic acid, and isokermesic acid may also be useful in this regard (Formula 3). In particular, the inventors recognized that these types of compounds have within their anthroquinone core both metal-complexing functionality and an ortho-dihydroxybenzene functionality that may be effective for suppressing the formation of silica scale and other types of precipitates. For example, these types of compounds may be used for suppressing both silica scale and metal-containing precipitates, including metal scales such as aluminum scales, calcium scales (e.g., calcium carbonate and/or calcium sulfate), barium scales (e.g., barium sulfate) or strontium scales (e.g., strontium sulfate). The inventors do not believe that there has been any contemplation in the art of using these types of compounds for treating a subterranean formation, particularly to suppress formation of silica scale or other types of metal-containing precipitates.

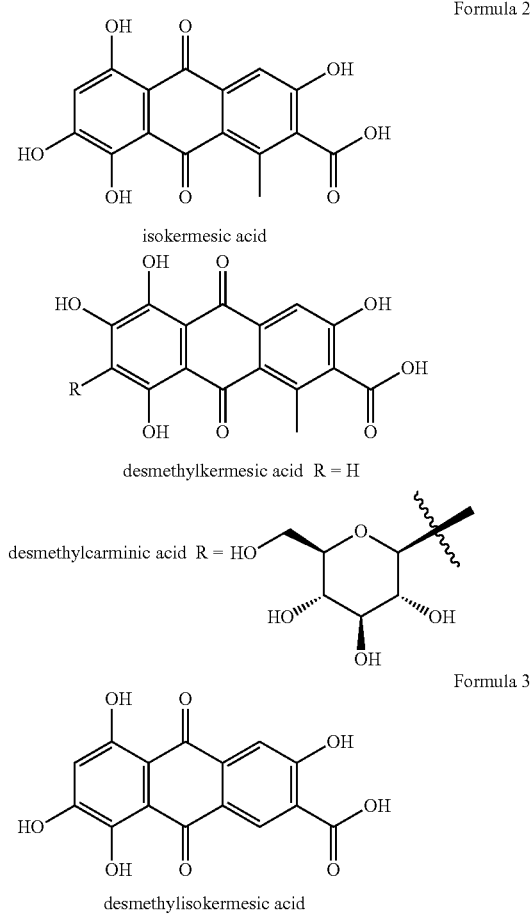

As well as bearing dual functionality, carminic acid and compounds related thereto are generally considered to be non-toxic. In this regard, they are widely used as dyes, including within various foodstuffs intended for human consumption. Carminic acid is generally isolated from the exoskeletons of cochineal insects. Kermesic acid is likewise naturally derived from Kermes Mids. Hence, the introduction of these types of compounds into a subterranean formation during a dissolution process is not expected to present a significant environmental burden either during their initial introduction or during post-dissolution production from the wellbore.

In addition to identifying dual-functionality compounds that may suppress various types of precipitation in a subterranean formation, the inventors also identified a naturally occurring corrosion inhibitor compound that may further facilitate various types of subterranean operations in which acids are used and/or in which hydrogen sulfide is present. Specifically, the inventors identified that retinaldehyde (also known as retinal or Vitamin A aldehyde) possesses an $\alpha,\beta$-unsaturated aldehyde moiety that may provide corrosion inhibition properties and $H_2S$-scavenging capabilities. In addition to $H_2S$-scavenging properties, retinaldehyde may further serve as an inhibitor to reduce the incidence of sulfide-induced cracking of metal tubulars and other types of metal goods. Like carminic acid and related compounds, retinaldehyde is not anticipated to add to the environmental burden of a treatment operation. Although retinaldehyde may be used individually for suppressing corrosion, it may be particularly advantageous when used in combination with carminic acid or compounds related thereto, since doing so may provide a treatment fluid that is both corrosion- and precipitation-suppressed without adding appreciably to the treatment fluid's environmental burden.

Accordingly, in various embodiments, treatment fluids described herein may comprise a carrier fluid and an ortho-dihydroxylated aromatic compound comprising a substance selected from the group consisting of carminic acid, kermesic acid, any salt thereof, any derivative thereof, and any combination thereof. As used herein, the term "salt" will refer to an ionic compound comprising a metal ion or an ammonium ion, in which there is substantially no complexation of the metal ion by a ligand. As used herein, the term "derivative" will refer to a compound obtained by replacing a first atom or group of atoms with a second atom or group of atoms. For example, in the case of carminic acid and kermesic acid, a derivative may be obtained by replacing any of the functionalities disposed at the various positions within the anthroquinone skeleton of these compounds, provided that the ortho-dihydroxy group and suitable metal-complexation capabilities are maintained in the derivative.

In some embodiments, the carrier fluid may comprise an aqueous carrier fluid. The glucose moiety of carminic acid may particularly facilitate its solubility in aqueous carrier fluids. Suitable aqueous carrier fluids may include, for example, fresh water, treated water, recycled water, ground water, flowback water, produced water, brackish water, acidified water, salt water, seawater, brine (e.g., a saturated salt solution), or an aqueous salt solution (e.g., a non-saturated salt solution). Aqueous carrier fluids may be obtained from any suitable source. Given the benefit of the present disclosure, one of ordinary skill in the art will be able to determine a suitable aqueous carrier fluid and amount thereof for utilization in the embodiments described herein.

In some embodiments, an organic co-solvent may be included with an aqueous carrier fluid. Suitable organic co-solvents may include, but are not limited to, glycols and alcohol solvents, for example. When present, the amount of the organic co-solvent may range between about 1% to about 50% by volume of the treatment fluid. Considerations for including an organic co-solvent along with an aqueous carrier fluid may include, for example, the solubility of the ortho-dihydroxylated aromatic compound at the concentration chosen for use in the treatment fluid.

A concentration of the ortho-dihydroxylated aromatic compound in the treatment fluids described herein may be dictated by the quantity of metal ions needing sequestration in the course of conducting a particular treatment operation and/or a desired degree of soluble silicon compounds whose precipitation may need to be suppressed. In various embodiments, a concentration of the ortho-dihydroxylated aromatic compound in the treatment fluid may range between about 0.1% to about 20% by weight of the treatment fluid. In more particular embodiments, a concentration of the ortho-dihydroxylated aromatic compound in the treatment fluid may range between about 1% to about 15% by weight of the treatment fluid, or between about 1% to about 5% by weight of the treatment fluid, or between about 1% to about 10% by weight of the treatment fluid, or between about 5% to about 10% by weight of the treatment fluid, or between about 5% to about 15% by weight of the treatment fluid.

In some embodiments, the ortho-dihydroxylated aromatic compound may comprise carminic acid, kermesic acid, any salt thereof, or any combination thereof. The structures of these compounds are shown in Formula 1 above. In other various embodiments, the ortho-dihydroxylated aromatic compound may comprise a derivative of these compounds, such as desmethylcarminic acid, desmethylkermesic acid, any salt thereof, or any combination thereof.

In some embodiments, the treatment fluids described herein may further comprise hydrofluoric acid or a hydrofluoric acid-generating compound. Suitable hydrofluoric acid-generating compounds may include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, boron trifluoride and various boron trifluoride complexes. Use of pyridinium fluoride may be particularly desirable for providing a concurrent function of clay stabilization within the subterranean formation.

When used, a hydrofluoric acid-generating compound can be present in the treatment fluids described herein in an amount ranging between about 0.1% to about 20% by weight of the treatment fluid. In more specific embodiments, an amount of the hydrofluoric acid-generating compound can range between about 0.5% to about 10% by weight of the treatment fluid or between about 0.5% to about 8% by weight of the treatment fluid. Hydrofluoric acid, when present, may be used in similar concentration ranges.

In further embodiments, the treatment fluids may further comprise a mineral acid, an organic acid, an acid-generating compound or any combination thereof. Such acids and acid-generating compounds may be present alone or in combination with hydrofluoric acid and/or a hydrofluoric acid-generating compound. Suitable mineral acids may include, but are not limited to, hydrochloric acid and hydrobromic acid. Suitable organic acids may include, but are not limited to, formic acid, acetic acid, methanesulfonic acid, chloroacetic acid, dichloroacetic acid, trichloroacetic acid, fluoroacetic acid, difluoroacetic acid, trifluoroacetic acid, and any combination thereof. Acid-generating compounds may also be used in the treatment fluids in a comparable manner. Suitable acid-generating compounds that may be used in some embodiments described herein include, for example, esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol.

When the treatment fluids of the present disclosure comprise a mineral acid such as hydrochloric acid, for example, the mineral acid may be present in the treatment fluids in an amount ranging between about 1% to about 10% of the treatment fluid by weight, or in an amount ranging between about 5% to about 10% of the treatment fluid by weight. Higher mineral acid concentrations may be used as well. Since organic acids are generally less acidic than are mineral acids, when the treatment fluids of the present disclosure comprise an organic acid, the organic acid may comprise up to about 20% of the treatment fluid by weight, particularly between about 1% to about 20% of the treatment fluid by weight, or between about 10% to about 20% of the treatment fluid by weight. Acid-generating compounds may be used to produce an acid at similar concentration values.

Depending on whether an acid is present, optionally in combination with hydrofluoric acid and/or a hydrofluoric acid-generating compound, and the concentration of each, the treatment fluids described herein can exhibit a wide range of pH values when introduced into a subterranean formation. In some embodiments, the treatment fluids described herein can have a pH value of about 4 or lower, or about 3.5 or lower, or about 3 or lower, or about 2.5 or lower, or about 2 or lower, or about 1.5 or lower, or about 1 or lower. In more particular embodiments, the pH of the treatment fluids may range between about 0 and about 4, or between about 1 and about 4, or between about 1 and about 3, or between about 2 and about 4. Factors that may be taken into account in determining a suitable pH for a particular treatment fluid include, for example, the type and composition of surface being treated and the desired dissolution rate.

In still further embodiments, the treatment fluids described herein may further comprise a corrosion inhibitor. The corrosion inhibitor may be present in the treatment fluids at a concentration that is effective to mitigate corrosion to a desired degree.

In more particular embodiments, the treatment fluids of the present disclosure may further comprise retinaldehyde or any derivative thereof. As discussed above, inclusion of retinaldehyde in a treatment fluid in combination with a hydrofluoric acid and/or other mineral acids or organic acids may serve to mitigate the corrosiveness of the acid(s) toward various metal surfaces, such as those in a wellbore. This compound may also provide similar protection from the corrosiveness of hydrogen sulfide. Illustrative metal surfaces that may be protected from corrosion by using retinaldehyde include, for example, tubulars, pipelines, welds, downhole tools and the like.

In some embodiments, the treatment fluids described herein may further comprise a surfactant that increases the miscibility of the ortho-dihydroxylated aromatic compound with the carrier fluid. Suitable surfactants are not believed to be particularly limited and may comprise cationic, anionic, zwitterionic, and/or neutral surfactants. When present, an amount of the surfactant in the treatment fluid may be about 10% or less by weight of the treatment fluid, with a typical range being between about 0.5% to about 5% by weight of the treatment fluid.

In additional embodiments, the treatment fluids described herein may further comprise any number of additives that are commonly used in downhole operations including, for example, silica scale control additives, chelating agents, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives may be used as well. Given the benefit of the present disclosure, one of ordinary skill in the art will be able to formulate a treatment fluid having properties suitable for a given application.

In other various embodiments, methods for treating a subterranean formation are described herein. In some embodiments, the subterranean formation may contain a siliceous material, and in some embodiments, the subterranean formation may contain a matrix that is primarily formed from a siliceous material. For example, in some embodiments, the subterranean formation may comprise a sandstone formation or a shale formation. In some or other embodiments, the subterranean formation may comprise a siliceous material in combination with a carbonate material.

In some embodiments, methods described herein may comprise: providing a treatment fluid comprising a carrier fluid and an ortho-dihydroxylated aromatic compound comprising a substance selected from the group consisting of carminic acid, kermesic acid, any salt thereof, any derivative thereof, and any combination thereof; and introducing the treatment fluid into a subterranean formation.

In various embodiments, the ortho-dihydroxylated aromatic compound may perform at least one function in the subterranean formation that is selected from the group consisting of inhibiting formation of silica scale, complexing a metal ion, and any combination thereof. Functioning as a silica scale control additive, the ortho-dihydroxlated aromatic compound may maintain a higher concentration of soluble silicon compounds than is otherwise possible without the ortho-dihydroxylated aromatic compound being present. When complexing a metal ion, the ortho-dihydroxylated aromatic compound may further suppress precipitation in the subterranean formation, as discussed in more detail above. The metal ion being complexed by the ortho-dihydroxylated aromatic compound may include, for example, an aluminum ion, an iron ion, a calcium ion, a magnesium ion, a barium ion, and/or a strontium ion, any of which may lead to undesirable precipitation and/or scaling effects within a subterranean formation if not properly mitigated.

The manner in which carminic acid and related compounds complex a metal ion in the embodiments of the present disclosure is not believed to be particularly limited. In some embodiments, complexation of a metal ion may occur between one of the anthroquinone carbonyls and one of the adjacent phenolic hydroxyl groups, such that a six-membered chelate ring is formed. In some embodiments, complexation of a metal ion may occur with the ortho-dihydroxyl groups forming a five-membered chelate ring with the metal ion. In still other embodiments, the carboxylic acid group and its adjacent phenolic hydroxyl group may complex a metal ion in a six-membered chelate ring. Combinations of these types of chelate rings may be present. Multiple metal ions may also be complexed with a single ortho-dihydroxylated aromatic compound of the present disclosure using a combination of the foregoing complexation motifs.

In some embodiments, the subterranean formation may contain a siliceous material. The siliceous material may be natively present in the subterranean formation or have been deliberately introduced to the subterranean formation in the course of conducting a treatment operation. As discussed above, hydrofluoric acid may promote dissolution of siliceous materials. Natively present siliceous materials that may be dissolved by hydrofluoric acid include, for example, sandstone, clay, quartz, feldspar, and the like. The hydrofluoric acid may be introduced to the subterranean formation separately from the treatment fluid comprising the ortho-dihydroxylated aromatic compound, or it may be present in the treatment fluid itself. When introduced separately, the hydrofluoric acid may be introduced to the subterranean formation prior to introduction of the treatment fluid comprising the ortho-dihydroxylated aromatic compound, or the hydrofluoric acid may be introduced afterward. Accordingly, the treatment fluids of the present disclosure may be used proactively or reactively to address various precipitations issues arising in the course of treating a subterranean formation. Hydrofluoric acid-generating compounds may be present in a treatment fluid of the present disclosure and used in a similar manner.

In further embodiments, the treatment fluids of the present disclosure may promote dissolution of a non-siliceous material, even when hydrofluoric acid or a hydrofluoric acid-generating compound are not present. In this regard, organic acids or mineral acids other than hydrofluoric acid may promote dissolution of a non-siliceous material, in which case the ortho-dihydroxylated aromatic compound may still complex a metal ion to mitigate its ability to subsequently re-precipitate. In still other embodiments, the treatment fluids of the present disclosure may promote direct dissolution of metal ions from a metal-containing surface, even in cases where another acid is not present to promote an initial dissolution of the metal ions. Accordingly, the treatment fluids of the present disclosure may be used for treating subterranean formations that are either siliceous in nature or non-siliceous in nature, such as those containing predominantly a carbonate material. Specifically, the treatment fluids may be used in the course of performing a dissolution process in the subterranean formation, with the dissolution process releasing from the subterranean formation a soluble silicon compound, a metal ion, or any combination thereof.

Although there may be some functionality associated with the ortho-dihydroxylated aromatic compound even when another acid is not present, the functions of metal ion complexation and/or inhibition of silica scale formation may be more evident when at least hydrofluoric acid or a hydrofluoric acid-generating compound is present (e.g., within a wellbore penetrating the subterranean formation or within the treatment fluid itself). In particular, the hydrofluoric acid or the hydrofluoric acid-generating compound may promote dissolution of a siliceous material and/or accompanying metal ions, and the ortho-dihydroxylated aromatic compound may dually inhibit re-precipitation of silica scale from the dissolved silicon compounds and/or other precipitates from a reaction of fluoride ions with dissolved metal ions and/or dissolved silicon compounds.

In more particular embodiments of the present disclosure, the treatment fluid may comprise hydrofluoric acid or a hydrofluoric acid-generating compound in combination with a mineral acid, an organic acid, or an acid-generating compound. The additional mineral acid and/or organic acid may maintain the treatment fluid's pH as the hydrofluoric acid spends, thereby better promoting dissolution of siliceous materials. The additional mineral acid and/or organic acid may also promote the conversion of a hydrofluoric acid-generating compound into hydrofluoric acid.

Accordingly, in more specific embodiments, methods of the present disclosure may comprise: providing a treatment fluid comprising: a carrier fluid; hydrofluoric acid or a hydrofluoric acid-generating compound; and an ortho-dihydroxylated aromatic compound comprising a substance selected from the group consisting of carminic acid, kermesic acid, any salt thereof, any derivative thereof, and any combination thereof; introducing the treatment fluid into a subterranean formation containing a siliceous material; and at least partially dissolving the siliceous material in the subterranean formation with the treatment fluid.

In some embodiments, the treatment fluids described herein may be utilized in matrix dissolution operations. In some embodiments, the treatment fluids described herein can be introduced to a subterranean formation below a fracture gradient pressure of the subterranean formation. In other embodiments, the treatment fluids described herein can be introduced to a subterranean formation at or above a fracture gradient pressure of the subterranean formation, such that one or more fractures are created or enhanced in the subterranean formation. Given the benefit of the present disclosure and the understanding of one having ordinary skill in the art, one can readily determine whether to introduce a treatment fluid to a subterranean formation at matrix flow rates (i.e., below the fracture gradient pressure) or at fracturing flow rates (i.e., at or above the fracture gradient pressure).

As used herein, the term "fracture gradient pressure" will refer to an equivalent fluid pressure sufficient to create or enhance one or more fractures in the subterranean formation. As used herein, the "fracture gradient pressure" of a layered formation also encompasses a parting fluid pressure sufficient to separate one or more adjacent bedding planes from one another. It should be understood that one of ordinary skill in the art may perform a simple leak-off test on a core sample to determine the fracture gradient pressure of a particular formation.

In some embodiments of the present disclosure, the subterranean formation may comprise a carbonate material in addition to a siliceous material, such as in a subterranean formation of mixed mineralogy. The carbonate material may occur natively in the subterranean formation, or it can have been introduced to the subterranean formation in the course of performing a treatment operation. In some embodiments, the treatment fluids described herein may be used to affect dissolution of a carbonate material before dissolution of a siliceous material takes place. For example, in some embodiments, a first treatment fluid comprising a mineral acid or an organic acid and the ortho-dihydroxylated aromatic compound may affect dissolution of a carbonate material within a subterranean formation, and a second treatment fluid comprising hydrofluoric acid or a hydrofluoric acid-generating compound, an ortho-dihydroxylated aromatic compound, and optionally a mineral acid or an organic acid may subsequently promote dissolution of the siliceous material. Optionally, the mineral acid or the organic acid may be omitted from the first treatment fluid, thereby allowing the ortho-dihydroxylated aromatic compound to affect direct dissolution of the carbonate material.

Accordingly, in some embodiments, the methods of the present disclosure may comprise dissolving a carbonate material in the subterranean formation. In such embodiments, at least a portion of the metal ions being complexed in the subterranean formation may arise from dissolution of the carbonate material. Illustrative metal ions that may result from dissolution of a carbonate material include, for example, calcium ions, magnesium ions, iron ions, and any combination thereof. Dissolution of a carbonate material may take place through an interaction between an acid in the treatment fluid, or the chelating groups of the ortho-dihydroxylated aromatic compound agent may interact directly with the carbonate material to affect dissolution, even when another acid is not present. Combinations of these dissolution processes are also possible.

Other sources of metal ions in the subterranean formation are also possible, and complexation of problematic metal ions from these alternative sources are also contemplated by the embodiments described herein. For example, metal ions resulting from corrosion of a metal surface can also be complexed according to the embodiments described herein. Corrosion suppression, such as by employing retinaldehyde or another corrosion inhibitor, can decrease the quantity of metal ions needing complexation by the ortho-dihydroxylated aromatic compound and lessen the chance that unwanted precipitation takes place.

In some embodiments, the treatment fluids described herein may be used in conjunction with a remediation operation conducted in a subterranean formation. Illustrative remediation operations are described hereinbelow.

In some embodiments, the treatment fluids described herein may be used to treat a proppant pack or a gravel pack in a subterranean formation in order to increase its permeability. Specifically, in some embodiments, the treatment fluids described herein may be used to at least partially remove a precipitated siliceous material or a non-siliceous material from the porosity of a proppant pack or gravel pack.

In some or other embodiments, the treatment fluids described herein may be used to remediate a subterranean formation or wellbore that has precipitation or accumulation damage therein. As used herein, the term "precipitation or accumulation damage" will refer to a material that has been dissolved in a subterranean formation and deposited elsewhere within the subterranean formation or a wellbore, optionally after undergoing a further reaction. That is, the treatment fluids described herein may affect dissolution of such damage to restore the permeability of the subterranean formation and thereby increase its productivity. The precipitation or accumulation damage may result from any source, which may include another stimulation operation.

In other various embodiments, systems configured for delivering the treatment fluids of the present disclosure to a downhole location are described herein. In various embodiments, the systems can comprise a pump fluidly coupled to a tubular, the tubular containing a treatment fluid comprising a carrier fluid and an ortho-dihydroxylated aromatic compound comprising a substance selected from the group consisting of carminic acid, kermesic acid, any salt thereof, any derivative thereof and any combination thereof. In some embodiments, the treatment fluid may further comprise hydrofluoric acid or a hydrofluoric acid-generating compound. In still further embodiments, the treatment fluid may comprise a mineral acid, an organic acid, an acid-generating compound, or any combination thereof.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the fluid to enter into the subterranean formation. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from the subterranean formation.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for treating a subterranean formation. The methods comprise: providing a treatment fluid comprising a carrier fluid and an ortho-dihydroxylated aromatic compound comprising a substance selected from the group consisting of carminic acid, kermesic acid, any salt thereof, any derivative thereof, and any combination thereof; and introducing the treatment fluid into a subterranean formation.

B. Methods for treating a subterranean formation. The methods comprise: providing a treatment fluid comprising: a carrier fluid; hydrofluoric acid or a hydrofluoric acid-generating compound; and an ortho-dihydroxylated aromatic compound comprising a substance selected from the group consisting of carminic acid, kermisic acid, any salt thereof, any derivative thereof, and any combination thereof; introducing the treatment fluid into a subterranean formation containing a siliceous material; and at least partially dissolving the siliceous material in the subterranean formation with the treatment fluid.

C. Treatment fluids comprising an ortho-dihydroxylated aromatic compound. The treatment fluids comprise: a carrier fluid; and
an ortho-dihydroxylated aromatic compound comprising a substance selected from the group consisting of carminic acid, kermesic acid, any salt thereof, any derivative thereof, and any combination thereof.

D. Systems for delivering a treatment fluid to a subterranean formation. The systems comprise a pump fluidly coupled to a tubular, the tubular containing a treatment fluid comprising a carrier fluid, and an ortho-dihydroxylated aromatic compound comprising a substance selected from the group consisting of carminic acid, kermesic acid, any salt thereof, any derivative thereof, and any combination thereof.

Each of embodiments A-D may have one or more of the following additional elements in any combination:

Element 1: wherein the subterranean formation contains a siliceous material.

Element 2: wherein the method further comprises performing a dissolution process in the subterranean formation, the dissolution process releasing from the subterranean formation a soluble silicon compound, a metal ion, or any combination thereof.

Element 3: wherein the method further comprises introducing hydrofluoric acid or a hydrofluoric acid-generating compound into the subterranean formation.

Element 4: wherein the treatment fluid further comprises the hydrofluoric acid or the hydrofluoric acid-generating compound.

Element 5: wherein the treatment fluid further comprises a mineral acid, an organic acid, an acid-generating compound, or any combination thereof.

Element 6: wherein the subterranean formation comprises a sandstone formation.

Element 7: wherein the ortho-dihydroxylated aromatic compound performs at least one function in the subterranean formation selected from the group consisting of inhibiting formation of silica scale, complexing a metal ion, and any combination thereof.

Element 8: wherein the ortho-dihydroxylated aromatic compound comprises carminic acid, acid, any salt thereof, or any combination thereof.

Element 9: wherein the ortho-dihydroxylated aromatic compound comprises desmethylcarminic acid, desmethylkermesic acid, any salt thereof, or any combination thereof.

Element 10: wherein the treatment fluid further comprises retinaldehyde or any derivative thereof.

By way of non-limiting example, exemplary combinations applicable to A-D include:

The method of A in combination with elements 1 and 4.
The method of A in combination with elements 2 and 4.
The method of A in combination with elements 1, 2 and 4.
The method of A in combination with elements 1, 2 and 3.
The method of A in combination with elements 4 and 5.
The method of A in combination with elements 2 and 7.
The method of A in combination with elements 4 and 8.
The method of A in combination with elements 4 and 10.
The method of A in combination with elements 5 and 10.
The method of B in combination with elements 6 and 7.
The method of B in combination with elements 5 and 10.
The method of B in combination with elements 8 and 10.
The method of B in combination with elements 7 and 8.
The treatment fluid of C or the system of D in combination with elements 4 and 5.
The treatment fluid of C or the system of D in combination with elements 4 and 8.
The treatment fluid of C or the system of D in combination with elements 5 and 8.
The treatment fluid of C or the system of D in combination with elements 4 and 9.
The treatment fluid of C or the system of D in combination with elements 5 and 9.
The treatment fluid of C or the system of D in combination with elements 4 and 10.
The treatment fluid of C or the system of D in combination with elements 5 and 10.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   providing a treatment fluid comprising
      a carrier fluid,
      an ortho-dihydroxylated aromatic compound comprising a substance selected from the group consisting of kermesic acid, any salt thereof, any derivative thereof, and any combination thereof, and
      hydrofluoric acid or a hydrofluoric acid-generating compound;
   introducing the treatment fluid into a subterranean formation, wherein the subterranean formation contains a siliceous material; and
   performing a dissolution process in the subterranean formation, the dissolution process releasing from the subterranean formation a soluble silicon compound, a metal ion, or any combination thereof.

2. The method of claim 1, wherein the treatment fluid further comprises a mineral acid, an organic acid, an acid-generating compound, or any combination thereof.

3. The method of claim 1, wherein the subterranean formation comprises a sandstone formation.

4. The method of claim 1, wherein the ortho-dihydroxylated aromatic compound performs at least one function in the subterranean formation selected from the group consisting of inhibiting formation of silica scale, complexing a metal ion, and any combination thereof.

5. The method of claim 1, wherein the ortho-dihydroxylated aromatic compound comprises desmethylkermesic acid, any salt thereof, or any combination thereof.

6. The method of claim 1, wherein the treatment fluid further comprises retinaldehyde or any derivative thereof.

7. The method of claim 6, wherein the treatment fluid further comprises a mineral acid, an organic acid, an acid-generating compound, or any combination thereof.

8. A method comprising:
   providing a treatment fluid comprising:

a carrier fluid;
hydrofluoric acid or a hydrofluoric acid-generating compound; and
an ortho-dihydroxylated aromatic compound comprising a substance selected from the group consisting of kermesic acid, any salt thereof, any derivative thereof, and any combination thereof;
introducing the treatment fluid into a subterranean formation containing a siliceous material; and
at least partially dissolving the siliceous material in the subterranean formation with the treatment fluid.

9. The method of claim 8, wherein the ortho-dihydroxylated aromatic compound performs at least one function in the subterranean formation selected from the group consisting of inhibiting formation of silica scale, complexing a metal ion, and any combination thereof.

10. The method of claim 8, wherein the treatment fluid further comprises a mineral acid, an organic acid, an acid-generating compound, or any combination thereof.

11. The method of claim 10, wherein the ortho-dihydroxylated aromatic compound comprises desmethylkermesic acid, any salt thereof, or any combination thereof.

12. The method of claim 8, wherein the treatment fluid further comprises retinaldehyde or any derivative thereof.

* * * * *